July 8, 1941.  A. H. HATHAWAY  2,248,080
TRAILER
Filed Sept. 30, 1939  3 Sheets-Sheet 1
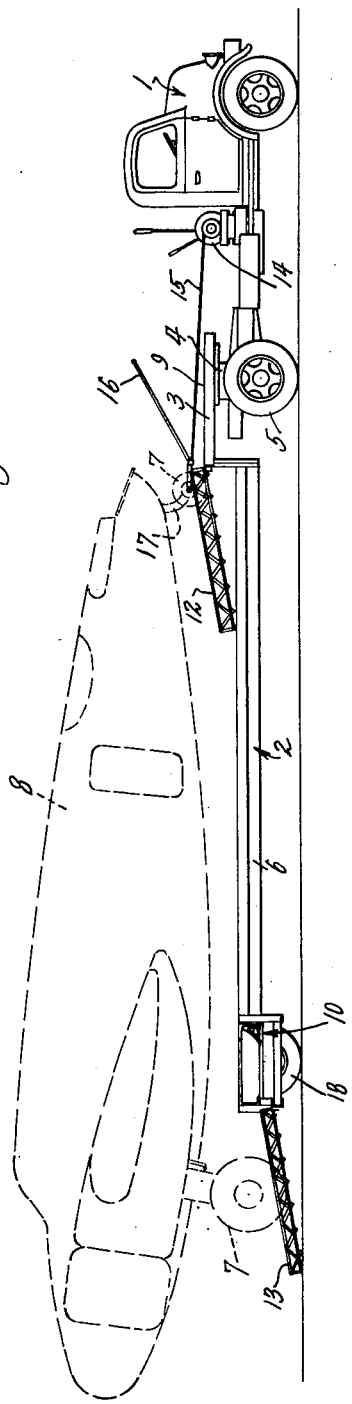
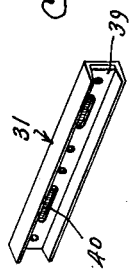
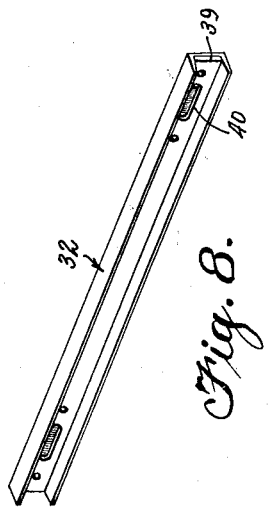
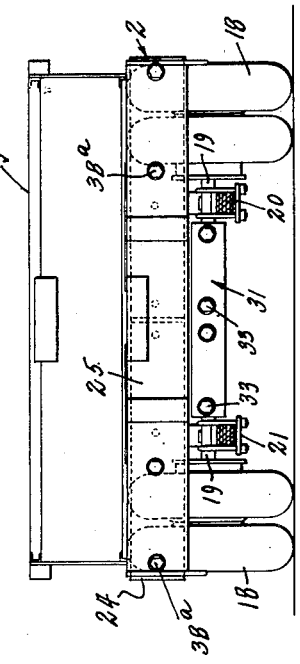
Inventor
Austin H. Hathaway
By Lyon & Lyon
Attorneys

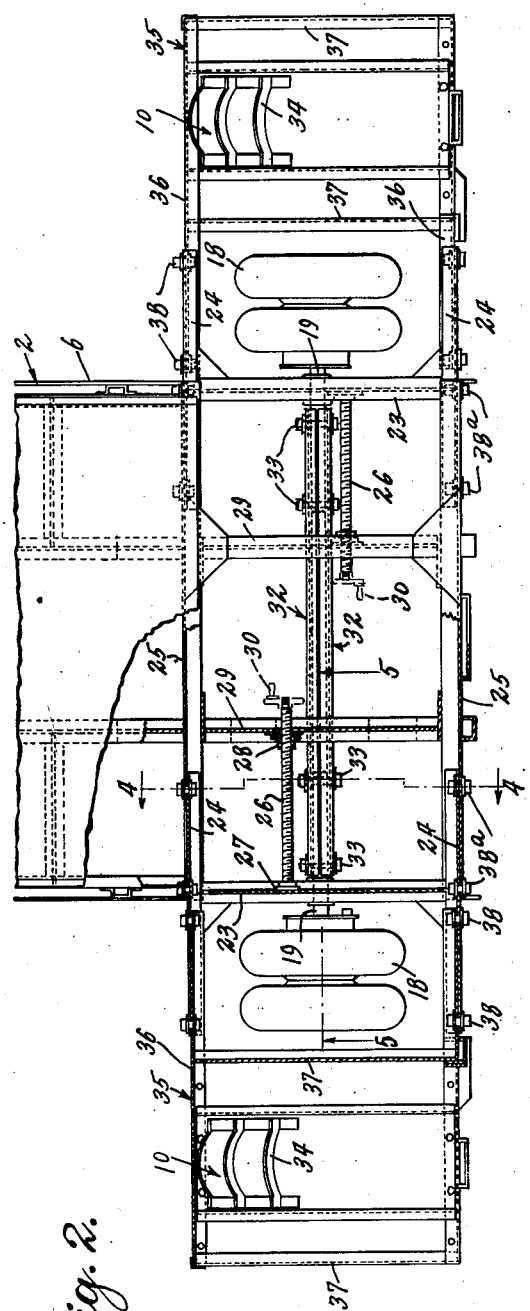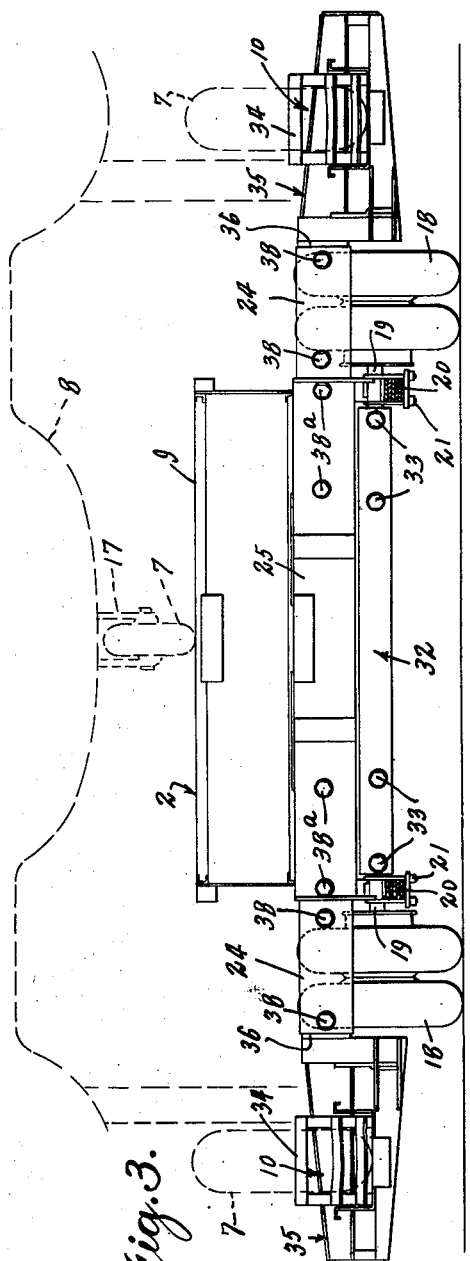

July 8, 1941.  A. H. HATHAWAY  2,248,080
TRAILER
Filed Sept. 30, 1939    3 Sheets-Sheet 3

Inventor
Austin H. Hathaway
By Lyon & Lyon
Attorneys

Patented July 8, 1941

2,248,080

UNITED STATES PATENT OFFICE 2,248,080

TRAILER

Austin H. Hathaway, Pasadena, Calif., assignor to Lyon Van & Storage Co., Los Angeles, Calif., a corporation of California Application September 30, 1939, Serial No. 297,285

3 Claims. (Cl. 280—34)

This invention relates to trailers, and more particularly to trailers having means whereby the gauge of the wheels may be varied in order to accommodate a load of greater width than that which might be properly supported upon a trailer of standard width.

In the transportation of such articles as airplanes, for example the heavier bombers, from point to point, a particular problem has been presented of providing a means for the economic transportation of such large airplanes, particularly over the highways. This problem arises particularly in connection with the transportation of such bombers from an airfield to a point where they may be properly loaded as, for example, on board a ship.

Such bombers are customarily now formed with a three-wheel landing gear and the gauge between two of these wheels is customarily in excess of the gauge of an ordinary trailer permitted by law to operate over a highway. In order to operate a vehicle of greater gauge upon a highway than that ordinarily permitted, special permission is required and can ordinarily only be obtained where special precautions are taken against the hazards of such a vehicle operation on the public highways. Thus even when special permission is granted for the operation of such a vehicle on the highway, the restrictions imposed upon their use are such as to make it inadvisable to operate the vehicle on the highway except under conditions of dire necessity.

In order to support an airplane, it is advisable to provide a support for the three wheels of the landing gear thereof and as these wheels are spaced apart a distance greatly in excess of the gauge of an ordinary vehicle, it is necessary to increase the gauge of the wheels to a point where they may properly support the load imposed upon the vehicle during such use.

It is therefore an object of my invention to provide a trailer having means whereby the gauge of the wheels may be quickly and conveniently varied to the position required by the particular load to be carried thereby and which is also susceptible of quick and ready adjustability to standard conditions when such load is not required to be carried thereby.

Another object of my invention is to provide for varying the gauge of the wheels, or a pair of wheels, thereof and wherein the means for supporting the wheels is variable with the wheels so that an extended lever condition does not exist between the extended wheels and their position of support.

Another object of my invention is to provide a means wherein a trailer of standard width may be easily and effectively converted into a trailer of extended gauge applicable for supporting the wide gauge wheels of an aircraft required to be transported.

Other objects and advantages of this invention it is believed will be transparent from the following description of a preferred embodiment thereof as illustrated in the accompanying drawings.

In the drawings:

Figure 1 is a side elevation of a trailer embodying my invention illustrating the loading onto such trailer of an airplane shown in dotted lines.

Figure 2 is a fragmental top plan view in horizontal section of the rear portion of such trailer illustrating the adjustable gauge means embodying my invention.

Figure 3 is a rear elevation of the trailer as illustrated in Figure 1 illustrating the wheels as extended to the wide gauge required for the accommodation and support of the running gear of the aircraft supported thereby and shown partially in dotted lines.

Figure 6 is a rear elevation of the trailer embodying my invention illustrating the same as adjusted to standard or permitted gauge.

Figure 7 is a detached perspective view of one of the axle adjustment means embodied in my invention for the narrower gauge adjustment.

Figure 8 is a view similar to Figure 7 of the extended gauge axle embodying my invention.

Figure 4:
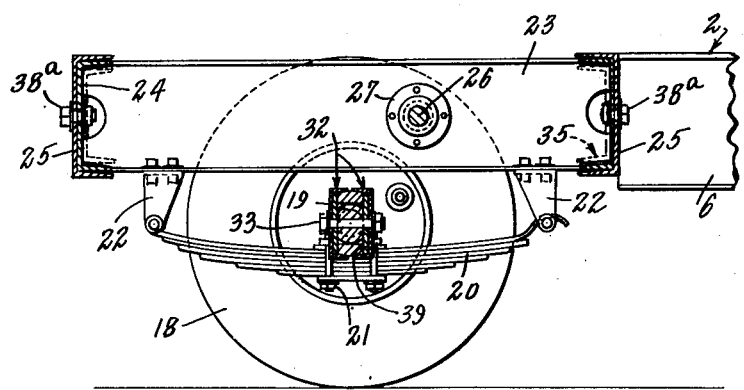
Figure 4 is a sectional end view taken substantially on the line 4—4 of Figure 2.
Figure 5:
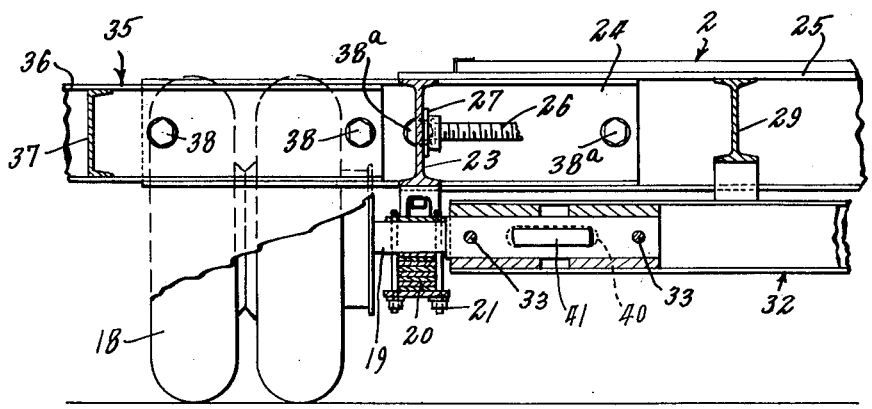
Figure 5 is a fragmental sectional rear elevation taken substantially on the line 5—5 of Figure 2.

In the preferred embodiment of my invention as illustrated in the accompanying drawings, 1 indicates a truck and 2 a semi-trailer therefor. While I have indicated my invention as adapted to a semi-trailer, it will be obvious that the same is equally susceptible of use in connection with a full trailer. I refer to the structure 2 as a semi-trialer because the same is of the structure as indicated where its forward end 3 is rotatably supported, as is common in the art, on a supporting means indicated at 4 over the rear wheels 5 of the truck 1.

The semi-trailer 2 includes a frame 6 of any suitable or desirable construction and there is provided three points of support for the three wheels 7 of an airplane 8. Thus there is provided a platform 9 directly over the rotatable support 4 for the single wheel 7 of the running gear while the other wheels 7 of the airplane running gear are supported in supporting cradles 10 extended transversely from the frame 6 of the trailer 2. This manner of supporting the aircraft is particularly advantageous in that it enables the aircraft to be supported at its points of normal support without the necessity of constructing special supporting elements for the individual outlines of the aircraft required to be transported. It is also particularly advantageous in that it enables the aircraft to be quickly loaded and unloaded from the supporting trailer by means as indicated in Figure 1. Thus there is provided runways 12 and 13 for the said wheels 7 of the aircraft and the aircraft is pulled into position onto the trailer through the use of a suitable hoist 14 carried on the truck 1.

A cable 15 is connected between the hoist 14 and the aircraft 8 as, for example, by connecting the same with the support for the trailing wheels 7. A guide fork 16 may be secured to the caster support 17 for said rear wheel 7 enabling the operator to guide the said wheels 7 onto the track 12 as the plane is pulled onto the body of the trailer 2 riding upon its own supporting wheels 7 during this movement.

In order to permit the regulation of the gauge of the wheels 18 of the trailer 2 so that they may properly support the wheels 7 of the aeroplane 8, I have provided means whereby the said wheels 18 may be moved to an extended position so that the load of the aircraft is supported directly by the wheels 18 and whereby the wheels 18 are supported directly from the truck body 6 in their extended position. Thus the wheels 18 are mounted upon stub axles 19 to which exles 19 the supporting springs 20 are secured by suitable means such, for example, as by the spring supports 21. The opposite ends of the supporting springs 20 are supported by means of spring shackles 22 which are affixed to frame members 23. The frame members 23 are in turn secured between frame channels 24 which frame channels 24 are adapted to slide within frame channels 25 spaced apart at the rear of the frame 6 of the trailer 2. The frame channels 24 are adapted to be moved with the frame member 23 and the wheels 18 and stub axles 19 and supporting springs 20 inward or outward to vary the gauge of the said wheels 18. Means are provided for so moving the wheels 18 and its supporting structure, which means preferably include screw-members 26 which are secured as indicated at 27 to frame members 23 and are threaded through the jack nuts 28 secured to the frame members 29 of the frame 6. Turning wheels 30 are provided for the screws 26. Thus when it is desired to extend the gauge of the wheels 18, the frame 6 may be elevated through the use of suitable jacks (not shown) and the wheels may be moved to the desired position by the turning of the adjustment screws 26.

In order to rigidly secure the said wheels together in their adjusted positions, extension axle members 31 and 32 are provided. Members 31 and 32 are of a length determined by the gauge to which the said wheels 18 are to be adjusted. Thus when the wheels 18 are adjusted to the gauge indicated in Figure 2, the axle extension members 32, of which there are a pair, are mounted over the ends of the stub axles 19 and bolts 33 are passed through aligned holes formed in the stub axles 19 and axle extension members 32, thus locking the wheels in their set position of gauge. When it is desired to return the wheels 18 to the position of ordinary gauge, the same operation is followed except that in this case the shorter axle connecting members 31 are employed between the ends of the stub axles 19.

In order to support the wheels 7 of the aircraft 8, the cradles 10 are secured to the extended frame. These cradles 10 include wheel-receiving treads 34 secured within frames 35. The frames 35 include the transverse frame members 36 and the connecting frame elements 37. The transverse frame members 36 extend beyond the connecting frame members 37 and are of such width as to be received between the channels of the frame channels 24; being thus received the same are bolted in position by means of bolts 38.

After the wheels of the aircraft have thus been properly supported within the cradles 10 and upon the forward platform of the trailer 2, the plane may be properly lashed in position by means of suitable lashing elements to prevent the same from moving during transportation. When the point is reached at which it is desired to unload the plane, its unloading is a simple matter of merely pulling the same on its own wheels off from the trailer 2 and down suitable runways 12 and 13. The trailer may be then restored to its normal gauge so that it may be operated over the highway without special permission by removing the cradles 10 and returning the wheels 18 to normal gauge. In this position the extended axle elements 32 and cradles 10 may be carried upon the body of the trailer 2 to the place where it is again necessary to extend the gauge of the trailer.

The axle connecting members 31 and 32 may be provided with means for aligning the same with the stub axles 19. The channel members 31 and 32 are fitted with aligning plates 39. The aligning plates 39 are formed with aligning slots 40 which correspond in position and length with bosses 41 formed on the stub axle 19. Thus when the slots 40 are fitted over the bosses 41, the axles are aligned. In this position the securing bolts 33 are passed through the aligned bolt holes to secure the members 31 or 32 to the stub axles.

The extensible frames 23 are adapted to be held in extended position by means of the bolts 38ª. The bolts 38ª may also be passed through the bolt holes, now occupied by the bolts 38 (Figure 2) when the frame 23 is retracted as shown in Figure 6.

Having fully described my invention, it is to be understood that I do not wish to be limited to the details herein set forth, but my invention is of the full scope of the appended claims.

I claim:

1. A trailer adapted for use in transporting aircraft, which trailer includes a frame, stub axle and spring assemblies at the rear opposite sides of the frame for supporting the frame, means for detachably connecting said stub axles together, means for extending the stub axle spring and wheel assemblies laterally of the frame including the replacement of said connecting means with connecting means of a greater length, and means whereby wheel supporting cradles may be attached outside of said wheels when extended.

2. In an aircraft carrier trailer, the combination of a frame, supporting wheels for the rear of said trailer, stub axles upon which the supporting wheels are journaled, movable frames supporting said stub axles, means whereby the said movable frames may be shifted laterally to move the wheels to increase their gauge, means for connecting the stub axles together in their extended position, and wheel cradles adapted to be secured in position beyond the wheels in their extended position.

3. A trailer having a frame, spaced transverse channels at the rear of said frame, wheel supporting frames positioned between said channels whereby the wheel supporting frames may be moved outwardly to increase the gauge of the wheels, wheel carrying cradles removably connected to the wheel frames beyond the wheels, each of said wheel frames carrying a stub axle upon which supporting wheels are journaled and removable axle connecting members connected between the stub axles in extended position, their being aligning bosses and recesses cooperating between the stub axles and the axle connecting means for aligning the axles in extended position.

AUSTIN H. HATHAWAY.